Feb. 21, 1939.　　F. G. WILLIAMSON　　2,147,871
BRAKE MECHANISM
Filed March 6, 1937　　2 Sheets-Sheet 1
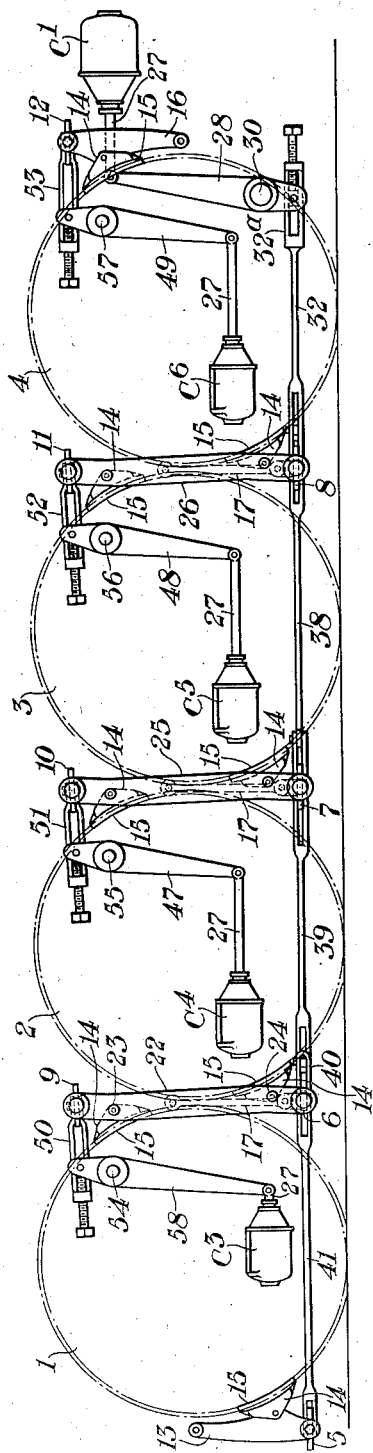
INVENTOR
Frederick G. Williamson.
BY
HIS ATTORNEY Feb. 21, 1939.  F. G. WILLIAMSON  2,147,871
BRAKE MECHANISM
Filed March 6, 1937  2 Sheets-Sheet 2
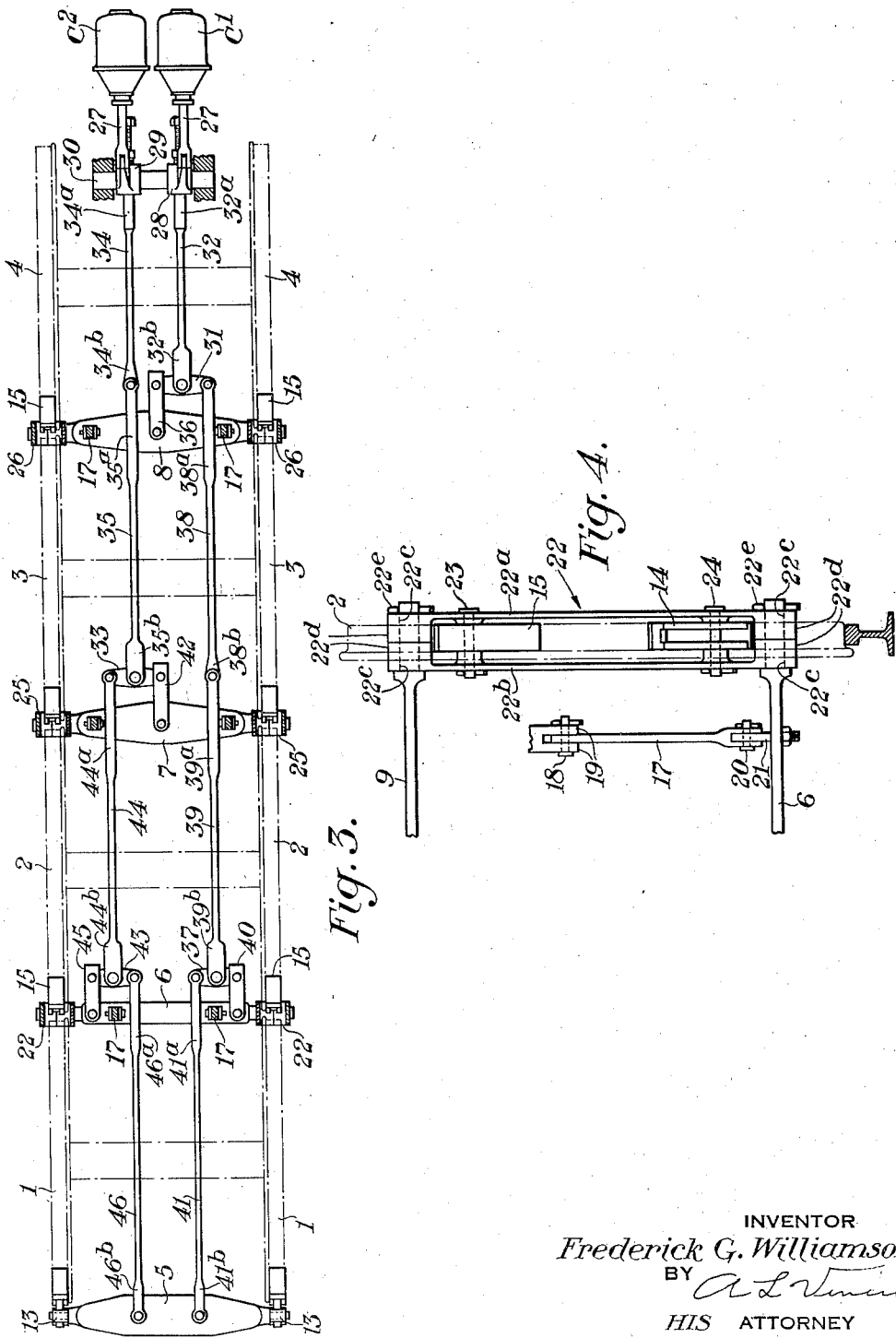
INVENTOR
Frederick G. Williamson.
BY
HIS ATTORNEY Patented Feb. 21, 1939

2,147,871

UNITED STATES PATENT OFFICE 2,147,871

BRAKE MECHANISM

Frederick G. Williamson, Wilkinsburg, Pa., assignor to The American Brake Company, Swissvale, Pa., a corporation of Missouri Application March 6, 1937, Serial No. 129,413

42 Claims. (Cl. 188—46)

My invention relates to brake mechanism, and particularly to brake mechanism for applying clasp brakes to the driving wheels of locomotives of the type in which the driving wheels are located as close together as the necessary clearance between the wheels themselves will permit.

I will describe one form of brake mechanism embodying my invention, and will then point out the novel features thereof in claims.

In the accompanying drawings, Fig. 1 is a view, partly diagrammatic and partly in side elevation, showing one form of brake mechanism embodying my invention applied to the driving wheels of a locomotive having four pairs of driving wheels. Figs. 2 and 3 are top plan views, partly diagrammatic, illustrating different portions of the brake mechanism shown in Fig. 1; certain of the parts being omitted for the sake of clearness. Fig. 4 is a view of the supporting lever 22 and associated parts as they appear when viewed from the left in Fig. 1.

Similar reference characters refer to similar parts in each of the several views.

Referring to the drawings, I have here shown my invention applied to the driving wheels 1, 2, 3, and 4 of a locomotive of the type having four pairs of driving wheels located as close together as the necessary clearance between the wheels themselves will permit to decrease the overall length of the locomotive, and thus facilitate the negotiation of curves by the locomotive, the various parts of the locomotive other than the driving wheels being omitted from the drawings to simplify the disclosure.

Extending transversely of the wheels 1, 2, 3, and 4 considerably below the horizontal plane passing through their centers are brake beams 5, 6, 7, and 8, and extending transversely of the wheels 1, 2, 3, and 4 considerably above the horizontal plane passing through their centers are other brake beams 9, 10, 11, and 12, the brake beams 6, 7, and 8 being disposed directly below the brake beams 9, 10, and 11, respectively.

The brake beam 5 is supported for movement toward and away from the wheel 1 to brake applying and brake releasing positions by means of a pair of supporting levers 13, the upper ends of which are pivotally secured to the locomotive frame in any convenient manner not shown, and the lower ends of which are pivotally connected with the opposite ends of the brake beam. Secured to each of the levers 13 intermediate its ends is a brake head 14 carrying a brake shoe 15 which, when the brake beam 5 is moved to its brake applying position, is adapted to engage the wheel 1 in a zone located some distance below the horizontal plane passing through the axis of the wheel.

The brake beam 12 is supported for movement between brake applying and brake releasing positions by means of a pair of supporting levers 16 which are similar to the supporting levers 13, but which are oppositely disposed to the levers 13. Each of the levers 16 has pivotally secured thereto a brake head 14 carrying a brake shoe 15 which, when the brake beam 12 is moved toward the left to its brake applying position, is adapted to engage the wheel 4 in a zone located some distance above the horizontal plane extending through the axis of this wheel.

The brake beams 6, 7, and 8 are each supported for movement toward and away from the associated wheels 2, 3, and 4 to brake applying and brake releasing positions by means of an associated pair of hangers 17, one of which hangers is located adjacent each end of each brake beam. These hangers are all alike, and are each secured to the locomotive and to the associated brake beam in the same manner that the hanger 17 shown in Fig. 4 is secured to the locomotive and to the brake beam 6. Referring to Fig. 4, the hanger 17 here shown is pivotally mounted at its upper end on a pin 18 which passes through aligned lugs 19 formed on the locomotive framework, and is pivotally connected at its lower end by means of a pivot pin 20 with an eye bolt 21 which is secured to the brake beam 6. The two hangers 17 of each pair are equally spaced from the ends of the brake beam, and are located at some distance inside of the plane of the wheels to avoid interference between the hangers and the other parts of the locomotive.

The brake beam 9 is supported for movement toward and away from the wheel 1 to brake applying and brake releasing positions by means of a pair of levers 22 which are pivotally connected at their upper ends to the opposite ends of the brake beam 9, and which are pivotally mounted at their lower ends on the opposite ends of the brake beam 6. Only one of the levers 22 is shown complete in the drawings, and as will be apparent from an inspection of Fig. 4, this lever comprises two spaced parallel portions 22a and 22b which are disposed out of the plane of the wheels 1 and 2 on opposite sides thereof in such manner that these parallel portions straddle adjacent portions of the two wheels 1 and 2 with some clearance. The spaced parallel portions are illustrated in the drawings as being separate and independent parts, but it should be particularly pointed out that these portions may, if desired, be joined together at their ends. Each of the two parallel portions 22$^a$ and 22$^b$ is provided at each end with a hole 22$^c$ for the reception of the rounded end of the brake beam 6 or 9, as the case may be, and with a boss 22$^d$ which coöperates with the corresponding boss on the other portion to maintain the proper spacing between the two portions. Each lever is held in place on the ends of the brake beams 6 and 9 by means of suitable cotter keys 22$^e$.

Mounted between the two spaced parallel portions 22$^a$ and 22$^b$ of each lever 22 on pins 23 and 24 which are disposed adjacent the opposite ends of the lever are brake heads 14 carrying brake shoes 15. The upper brake shoe 15 is adapted, when the brake beam 9 is moved to its brake applying position, to engage the adjacent wheel 1 in a zone which is diametrically opposite to the zone at which the brake shoe 15 secured to the lever 13 is adapted to engage this wheel, while the lower brake shoe 15 is adapted, when the brake beam 6 is moved to its brake applying position, to engage the adjacent wheel 2 in a zone which is located the same distance below the horizontal plane passing through the axis of the wheel 2 as the zone in which the brake shoe 15 carried by the lever 13 is adapted to engage the wheel 1.

The brake beams 10 and 11 are supported for movement toward and away from the wheels 2 and 3, to brake applying and brake releasing positions, by means of supporting levers 25 and 26 which are identical in construction to the previously described lever 22, and each of which has pivotally attached thereto adjacent its opposite ends brake heads 14 which carry brake shoes 15. The upper brake shoe 15 attached to the supporting lever 25 is adapted, when the brake beam 10 is moved to its brake applying position, to engage the wheel 2 in a zone which is diametrically opposite to that at which the lower brake shoe 15 secured to the lever 22 is adapted to engage wheel 2, while the lower brake shoe secured to the supporting lever 25 is adapted to engage the wheel 3 in a zone which is located substantially the same distance below the horizontal plane passing through the axis of the wheels as the zone in which the shoes 15 attached to the levers 13 and 22 are adapted to engage the wheels 1 and 2, respectively. The two brake shoes 15 secured to the lever 26 are adapted, when the brake beams 11 and 8 are moved to their brake applying positions, to engage the wheels 3 and 4, respectively, in zones which are located diametrically opposite to the zones in which the lower brake shoe 15 secured to the lever 25, and the brake shoe 15 secured to the lever 16, are adapted to engage the wheels 3 and 4, respectively.

The brake mechanism also comprises means for actuating the brake beams between their brake applying and brake releasing positions to effect the application of the brakes. As here illustrated, these means include a plurality of brake cylinders C$^1$, C$^2$, C$^3$, C$^4$, C$^5$, and C$^6$. These brake cylinders are of well-known construction, and it is believed that for purposes of the present disclosure it is sufficient to state that each of these brake cylinders includes the usual cylinder body, reciprocable piston (not shown) biased to the inner end of its stroke by the usual release spring (not shown), and a push rod 27 which is operatively connected with the piston.

The push rod 27 of the brake cylinder C$^1$ is pivotally connected at its outer end with the upper end of a brake cylinder lever 28, and the push rod 27 of the brake cylinder C$^2$ is similarly pivotally connected at its outer end with the upper end of a brake cylinder lever 29. The two brake cylinder levers 28 and 29 are each pivotally supported intermediate their ends on a transverse shaft 30 which is secured at its ends in supports mounted on the engine frame, and the lower end of the lever 28 is operatively connected with an equalizing lever 31, at or near its center, through the medium of a pull rod 32, while the lower end of the lever 29 is operatively connected with an equalizing lever 33, at or near its center, through the medium of two interconnected pull rods 34 and 35 arranged end to end. The pull rod 32 is provided at the end which is connected to the brake cylinder lever 28 with a slack adjuster 32$^a$ of well-known construction, and at its opposite end with a jaw 32$^b$ which receives the equalizing lever 31. The pull rod 34 is similarly provided at the end which is connected to the brake cylinder lever 29 with a slack adjuster 34$^a$, similar to the slack adjuster 32$^a$, and at its opposite end with an eye 34$^b$. The pull rod 35 is provided at the end which is connected to the pull rod 34 with a jaw 35$^a$ which straddles the brake beam 8 with sufficient clearance to permit free movement of this brake beam relative to the pull rod, and at its opposite end with a jaw 35$^b$ which receives the equalizing lever 33.

The equalizing lever 31 is pivotally connected at its inner end to a strap link 36, which strap link, in turn, is pivotally connected to the brake beam 8 at or near its center. The outer end of the equalizing lever 31 is operatively connected with another equalizing lever 37, at or near its center, through the medium of two interconnected pull rods 38 and 39 arranged end to end, and the outer end of this latter equalizing lever is operatively connected with one end of the brake beam 6 through the medium of a strap link 40, while the inner end of the equalizing lever 37 is operatively connected with one end of the brake beam 5 through the medium of the pull rod 41. The pull rod 38 is provided at the end which is connected with the equalizing lever 31 with a jaw 38$^a$ which straddles the brake beam 8 with some clearance and which receives the equalizing lever, and at its opposite end with an eye 38$^b$. The pull rod 39 is provided at one end with a jaw 39$^a$ which straddles the brake beam 7 with some clearance and at the opposite end with a jaw 39$^b$ which receives the equalizing lever 37. The pull rod 41 is provided at the end which is connected with the equalizing lever 37 with a jaw 41$^a$ which straddles the brake beam 6 with some clearance and which receives the equalizing lever 37, and at the opposite end with a jaw 41$^b$ which receives the brake beam 5. The equalizing lever 33 is pivotally connected at its inner end to one end of a strap link 42, the other end of which is pivotally connected to the brake beam 7 at or near its center. The outer end of the equalizing lever 33 is operatively connected with an equalizing lever 43, at or near its center, by means of a pull rod 44 similar to the pull rod 39. The equalizing lever 43, in turn, is pivotally connected at its outer end to the brake beam 6 by means of a strap link 45 similar to the strap link 40, and at its inner end to the brake beam 5 by means of a pull rod 46 similar to the pull rod 41.

The push rods 27 of the brake cylinders C$^3$, C$^4$, C$^5$, and C$^6$ are operatively connected with the brake beams 9, 10, 11, and 12, respectively, at or near their centers, by means of brake cylinder levers 58, 47, 48, and 49, and suitable links 50, 51, 52, and 53, respectively, in a manner which will readily be understood from an inspection of Figs. 1 and 2. The brake cylinder levers 58, 47, 48, and 49 are similar to the brake cylinder levers 28 and 29 associated with the cylinders C¹ and C², and are pivotally supported intermediate their ends on pins 54, 55, 56, and 57, respectively, mounted in suitable lugs, not shown, provided on the locomotive framework. Each of the links 50, 51, 52, and 53 is provided at one end with a slack adjuster similar to the slack adjuster 32ª.

When no fluid is being supplied to the brake cylinders, as will normally be the case, the brake beams are held in their brake releasing positions in which they are shown in the drawings by the releasing springs mounted in the cylinders, and under these conditions, the brake shoes exert substantially no braking effort on the wheels.

When it is desired to apply the brakes, fluid pressure is simultaneously supplied to the brake cylinders C¹, C², C³, C⁴, C⁵, and C⁶, which fluid causes each of the push rods 27 to move outwardly in the associated cylinders in opposition to the release springs. The outward movement of the push rods 27 of the cylinders C¹ and C² acts through the linkage shown in Fig. 3 to move the brake beams 5, 6, 7, and 8 toward the wheels 1, 2, 3, and 4, respectively, to their brake applying positions in a manner which will be readily understood from an inspection of the drawings, while the outward movement of the push rods 27 of the cylinders C³, C⁴, C⁵, and C⁶ acts through the linkages shown in Fig. 2 to cause the brake beams 9, 10, 11, and 12 to move toward the wheels 1, 2, 3, and 4, respectively, to their brake applying positions in a manner which will also be understood from an inspection of the drawings.

The movement of the brake beam 5 to its brake applying position causes the associated supporting levers 13 to rotate in a counterclockwise direction, and hence causes the brake shoes 15 secured to these levers to frictionally engage the wheel 1.

The movement of the brake beams 6 and 9 to their brake applying positions causes the upper end of the lever 22 to move toward the left, and the lower end of this lever to move toward the right in substantially the same manner as if this lever were pivoted at a point midway between its ends, and thereby causes the upper brake shoe 15 to frictionally engage the wheel 1, and the lower brake shoe 15 to frictionally engage the wheel 2.

The movement of the two brake beams 7 and 10 and the two brake beams 8 and 11 to their brake applying positions similarly causes the levers 25 and 26 to move to positions in which the upper brake shoes 15 secured to these levers engage the wheels 2 and 3 and the lower brake shoes secured to these levers engage the wheels 3 and 4, while the movement of the brake beam 12 causes the levers 16 to rotate in a clockwise direction to the position in which the shoes 15 secured to these levers engage the wheels 4.

The parts are so proportioned that the braking forces exerted by the shoes will all be aproximately equal.

It should be particularly pointed out that with the braking apparatus constructed and arranged in the manner just described, no part of the brake apparatus is mounted in positions which necessitate the wheels being located any farther apart than the minimum distance necessary for the adjacent wheels to clear each other.

It should also be particularly pointed out that each of the levers 22, 25, and 26 performs the dual function of supporting the upper brake beams 9, 10, and 11, and two brake shoes, one for engaging each of the two contiguous wheels, and that the pivotal connections between these levers and the brake beams and between these levers and the brake heads are arranged in substantially the same plane so that when a brake application takes place, the minimum torsional stresses will be exerted on these levers.

Although I have herein shown and described only one form of brake mechanism embodying my invention, it is understood that various changes and modifications may be made therein within the scope of the appended claims without departing from the spirit and scope of my invention.

Having thus described my invention, what I claim is:

1. In a brake mechanism for a vehicle provided with a series of pairs of wheels located close together to facilitate negotiation of curves by the vehicle, a lever having spaced parallel portions which straddle two of the wheels at their contiguous portions, two brake shoes secured to said lever at spaced points located above and below the horizontal plane passing through the axes of said wheels and one cooperating with the one of said two wheels and the other cooperating with the other of said two wheels, and means for actuating said lever to move said shoes into frictional engagement with said two wheels.

2. In a brake mechanism for a vehicle having a series of pairs of wheels located close together to facilitate negotiation of curves by the vehicle, a lever having spaced parallel portions which straddle two of the wheels at their contiguous portions, two brake shoes secured to said lever and one cooperating with each of said two wheels, and means for actuating said lever at both ends to move said shoes into frictional engagement with said two wheels.

3. In a brake mechanism for vehicles having at least two pairs of wheels located close together, a lever having spaced parallel portions which straddle the contiguous portions of two adjacent wheels, two brake shoes one secured to said lever between said spaced parallel portions above the contiguous portions of the wheels and cooperating with one of said wheels and the other secured to said lever between said spaced parallel portions below the contiguous portions of the wheels and cooperating with the other wheel, and means connected with said lever at its opposite ends for actuating said lever to cause both brake shoes to frictionally engage the associated wheels.

4. In a brake mechanism for vehicles having at least two pairs of wheels located close together, a lever having spaced parallel portions which straddle the contiguous portions of two adjacent wheels, two brake shoes one secured to said lever between said spaced parallel portions above the contiguous portions of the wheels and cooperating with one of said wheels and the other secured to said lever between said spaced parallel portions below the contiguous portions of the wheels and cooperating with the other wheel, and means connected with said lever at its opposite ends for rotating said lever about an axis located intermediate its ends to cause said brake shoes to frictionally engage the associated wheels.

5. In a brake mechanism for vehicles having at least two pairs of wheels located close together, a lever having spaced parallel portions which straddle the contiguous portions of two adjacent wheels, two brake shoes one secured to said lever between said spaced parallel portions above the contiguous portions of the wheels and cooperating with one of said wheels and the other secured to said lever between said spaced parallel portions below the contiguous portions of the wheels and cooperating with the other wheel, and two operating members one connected with said lever at each end of the lever.

6. In a brake mechanism for vehicles having at least two pairs of wheels located close together, a lever having spaced parallel portions which straddle the contiguous portions of two adjacent wheels, two brake shoes secured to said lever and one cooperating with each of said two adjacent wheels, and two operating members for said lever one connected with said lever at each end of the lever.

7. In a brake mechanism for vehicles having at least two pairs of wheels located close together, a lever having spaced parallel portions which straddle the contiguous portions of two adjacent wheels, two brake shoes secured to said lever and one cooperating with each of said two adjacent wheels, and two operating members for said lever one connected with said lever at each end of the lever, the points of connection between said shoes and said lever and between said lever and said operating member being disposed substantially in the same plane.

8. In a brake mechanism for vehicles having at least two pairs of wheels located close together, a lever having spaced parallel portions which straddle the contiguous portions of two adjacent wheels, two brake shoes secured to said lever and one cooperating with each of said two adjacent wheels, and two operating members for said lever each movable between a brake applying and a brake releasing position, said operating members being connected with said lever at opposite ends of the lever.

9. In a brake mechanism for vehicles having at least two pairs of wheels located close together, a lever having spaced parallel portions which straddle the contiguous portions of two adjacent wheels, two brake shoes secured to said lever and one cooperating with each of said two adjacent wheels, and two operating members for said lever one movable toward and away from the one of said two adjacent wheels to brake applying and brake releasing positions and the other movable toward and away from the other of said two adjacent wheels to brake applying and brake releasing positions, said two operating members being connected with said lever at its opposite ends.

10. In a brake mechanism for vehicles having at least two pairs of wheels located close together, a first brake beam extending between said two pairs of wheels below the horizontal plane passing through their axes and supported for movement toward and away from the wheels of one pair to brake applying and brake releasing positions, two supporting levers one pivotally attached at its lower end to each end of said first brake beam and each provided with spaced parallel portions which straddle the contiguous portions of the adjacent wheels, a second brake beam extending between said two pairs of wheels above the horizontal plane passing through their axes and pivotally secured at its ends to the upper ends of said supporting levers for movement toward and away from the wheels of the other pair of wheels to brake applying and brake releasing positions, and a pair of brake shoes secured to each of said levers in such manner that when said brake beams are moved to their brake applying positions the one shoe of each pair will frictionally engage the wheels of said one pair of wheels and the other shoes of each pair will frictionally engage the wheels of said other pair of wheels.

11. In a brake mechanism for vehicles having at least two pairs of wheels located close together, a first brake beam extending between said two pairs of wheels below the horizontal plane passing through their axes and supported for movement toward and away from the wheels of one pair to brake applying and brake releasing positions, two supporting levers one pivotally attached at its lower end to each end of said first brake beam and each provided with spaced parallel portions which straddle the contiguous portions of the adjacent wheels, a second brake beam extending between said two pairs of wheels above the horizontal plane passing through their axes and pivotally secured at its ends to the upper ends of said supporting levers for movement toward and away from the wheels of the other pair of wheels to brake applying and brake releasing positions, two brake shoes one secured to each of said levers at a point located below the horizontal plane passing through the axes of the wheels and each cooperating with the adjacent wheel of said one pair of wheels, and two other brake shoes one secured to each of said levers at a point located above the axes of the wheels and each cooperating with the adjacent wheels of said other pair of wheels, the parts being so proportioned that when said brake beams occupy the brake applying positions each of said shoes will frictionally engage the associated wheel.

12. In a brake mechanism for vehicles having at least two pairs of wheels located close together, a first brake beam extending between said two pairs of wheels below the horizontal plane passing through their axes and supported for movement toward and away from the wheels of one pair to brake applying and brake releasing positions, two supporting levers one pivotally attached at its lower end to each end of said first brake beam and each provided with spaced parallel portions which straddle the contiguous portions of the adjacent wheels, a second brake beam extending between said two pairs of wheels above the horizontal plane passing through their axes and pivotally secured at its ends to the upper ends of said supporting levers for movement toward and away from the wheels of the other pair of wheels to brake applying and brake releasing positions, a pair of brake shoes secured to each of said levers in such manner that when said brake beams are moved to their brake applying positions the one shoe of each pair will frictionally engage the wheels of said one pair of wheels and the other shoes of each pair will frictionally engage the wheels of said other pair of wheels, and separate fluid pressure actuated means for moving said two brake beams between their brake applying and brake releasing positions.

13. In a brake mechanism for vehicles having at least two pairs of wheels located close together, a first brake beam extending between said two pairs of wheels below the horizontal plane passing through their axes and supported for movement toward and away from the wheels of one pair to brake applying and brake releasing positions, two supporting levers one pivotally attached at its lower end to each end of said first brake beam and each provided with spaced parallel portions which straddle the contiguous portions of the adjacent wheels, a second brake beam extending between said two pairs of wheels above the horizontal plane passing through their axes and pivotally secured at its ends to the upper ends of said supporting levers for movement toward and away from the wheels of the other pair of wheels to brake applying and brake releasing positions, two brake shoes one secured to each of said levers at a point located below the horizontal plane passing through the axes of the wheels and each cooperating with the adjacent wheel of said one pair of wheels, two other brake shoes one secured to each of said levers at a point located above the axes of the wheels and each cooperating with the adjacent wheels of said other pair of wheels, the parts being so proportioned that when said brake shoes occupy their brake applying positions each of said shoes will frictionally engage the associated wheel, and separate fluid pressure actuated means for moving said two brake beams between their brake applying and brake releasing positions.

14. In a brake equipment for a vehicle having a series of pairs of wheels, a plurality of brake beams one extending transversely of each pair of wheels below the horizontal plane extending through their axes and each supported by means of hangers for movement toward and away from the wheels of the associated pair to brake applying and brake releasing positions, a plurality of supporting levers one pivotally mounted at its lower end on each end of each of said brake beams and each having spaced parallel portions which straddle the contiguous portions of the adjacent wheels, a plurality of other brake beams one extending transversely of each pair of wheels above the horizontal plane extending through their axes and each pivotally connected at each end with one of said supporting levers for movement toward and away from an associated pair of wheels to brake applying and brake releasing positions, the two brake beams which are connected with the same pair of supporting levers being movable toward and away from different pairs of wheels, and a pair of brake shoes secured to each supporting lever at spaced points located on opposite sides of the horizontal plane passing through the axes of the wheels, the parts being so arranged and so proportioned that when said brake beams are moved to their brake applying positions the one shoe of each pair will engage a wheel at one side of the associated lever and the other shoe of each pair will engage a wheel at the opposite side of the associated lever.

15. In a brake equipment for a vehicle having a series of pairs of wheels, a plurality of brake beams one extending transversely of each pair of wheels below the horizontal plane extending through their axes and each supported by means of hangers for movement toward and away from the wheels of the associated pair to brake applying and brake releasing positions, a plurality of supporting levers one pivotally mounted at its lower end on each end of each of said brake beams and each having spaced parallel portions which straddle the contiguous portions of the adjacent wheels, a plurality of other brake beams one extending transversely of each pair of wheels above the horizontal plane extending through their axes and each pivotally connected at each end with one of said supporting levers for movement toward and away from an associated pair of wheels to brake applying and brake releasing positions, the two brake beams which are connected with the same pair of supporting levers being movable toward and away from different pairs of wheels, a pair of brake shoes secured to each supporting lever at spaced points located on opposite sides of the horizontal plane passing through the axes of the wheels, the parts being so arranged and so proportioned that when said brake beams are moved to their brake applying positions the one shoe of each pair will engage a wheel at one side of the associated lever and the other shoe of each pair will engage a wheel at the opposite side of the associated lever, and means connected with said brake beams for moving said brake beams between their brake applying and brake releasing positions.

16. In a brake mechanism for vehicles having at least two pairs of wheels located close together, a lever, two brake shoes secured to said lever and one cooperating with each of said two adjacent wheels, a combined operating and supporting means connected with said lever at one end of the lever, and an operating means connected with said lever at the other end of the lever.

17. In a brake mechanism for vehicles having at least two pairs of wheels located close together, a lever, two brake shoes secured to said lever and one cooperating with each of said two adjacent wheels, a combined operating and supporting means connected with said lever at the lower end of the lever, and another operating means connected with said lever at its upper end.

18. In a brake mechanism for vehicles having at least two pairs of wheels located close together, a lever movably supported at its lower end and having spaced parallel portions which extend upwardly on opposite sides of the contiguous portions of two adjacent wheels, two brake shoes secured to said lever between said spaced parallel portions and one cooperating with each of said two adjacent wheels, and means for rotating said lever about an axis located intermediate its ends to cause said brake shoes to frictionally engage the adjacent wheels.

19. In a brake mechanism for vehicles having at least two longitudinally aligned wheels at one side of the vehicle and arranged closely together, two brake shoes located between said wheels and arranged one above and one below the closest portions of the treads of said wheels and being movable in opposite directions into braking engagement with the treads of the wheels, a lever for actuating said shoes, a support for said lever, power applying means connected to one end of the lever, and power applying means connected to the other end of the lever, both of said power applying means being simultaneously operative to actuate said lever.

20. In a brake mechanism for vehicles having at least two longitudinally aligned wheels at one side of the vehicle and arranged closely together, two brake shoes located between said wheels and arranged one above and one below the closest portions of the treads of said wheels and being movable in opposite directions into braking engagement with the treads of the wheels, a lever for actuating said shoes, a support for said lever, means operative to apply braking power in one direction to one end of the lever, and other means operative to apply braking power in the opposite direction to the other end of the lever.

21. In a brake mechanism for vehicles having at least two longitudinally aligned wheels at each side of the vehicle and arranged closely together, two brake shoes located between the wheels at each side of the vehicle and arranged one above and one below the closest portions of the treads of said wheels and each being movable into braking engagement with the tread of the adjacent wheel, two levers arranged one at each side of the vehicle and each being operative to actuate the adjacent two brake shoes, a brake beam operatively connecting the lower ends of said levers, a brake beam operatively connecting the upper ends of said levers, and means for actuating said brake beams, the means for actuating one brake beam being separate from the means for actuating the other brake beam.

22. In a brake mechanism for vehicles having at least two longitudinally aligned wheels at each side of the vehicle and arranged closely together, two brake shoes located between the wheels at each side of the vehicle and arranged one above and one below the closest portions of the treads of said wheels and each being movable into braking engagement with the tread of the adjacent wheel, two levers arranged one at each side of the vehicle and each being operative to actuate the adjacent two brake shoes, a brake beam operatively connecting the lower ends of said levers, a brake beam operatively connecting the upper ends of said levers, said brake beams being movable in opposite directions to actuate said levers, and means for actuating said brake beams, the means for actuating one brake beam being separate from the means for actuating the other brake beam.

23. In a brake mechanism for vehicles having at least two longitudinally aligned wheels at each side of the vehicle and arranged closely together, two brake shoes located between the wheels at each side of the vehicle and arranged one above and one below the closest portions of the treads of said wheels and each being movable into braking engagement with the tread of the adjacent wheel, two levers arranged one at each side of the vehicle and each being operative to actuate the adjacent two brake shoes, a brake beam operatively connecting the lower ends of said levers, means supporting said brake beam and thereby said levers, a brake beam operatively connecting the upper ends of said levers and being supported by the levers, said brake beams being movable in opposite directions to actuate said levers, and separate fluid pressure responsive means for actuating each of said brake beams.

24. In a brake mechanism for a vehicle having a series of pairs of wheels, a set of two brake shoes located between each two adjacent wheels at each side of the vehicle and one of said brake shoes of the set being movable into braking engagement with one wheel and the other being movable into braking engagement with the adjacent wheel, a plurality of brake levers each arranged for actuating one set of brake shoes, a plurality of brake beams for actuating said levers and each extending transversely between each two pairs of wheels and operatively connecting the lower ends of the levers located oppositely to each other transversely of the vehicle, a system of operatively connected levers and rods for actuating said brake beams, a plurality of other brake beams for actuating said levers and each extending transversely between each two pairs of wheels and operatively connecting the upper ends of levers located oppositely to each other transversely of the vehicle, and a mechanism for individually actuating the last mentioned brake beams.

25. In a brake mechanism for a vehicle having a series of pairs of wheels, a set of two brake shoes located between each two adjacent wheels at each side of the vehicle and one of said brake shoes of the set being movable into braking engagement with one wheel and the other being movable into braking engagement with the adjacent wheel, a plurality of brake levers each arranged for actuating one set of brake shoes, a plurality of brake beams for actuating said levers and each extending transversely between each two pairs of wheels and operatively connecting the lower ends of the levers located oppositely to each other transversely of the vehicle, two brake shoes one associated with each wheel of the one end pair of wheels, a pair of levers one for actuating each of said last mentioned brake shoes, a brake beam for actuating said two last mentioned levers connecting their lower ends, a system of operatively connected levers and rods for actuating all of said previously mentioned brake levers, a plurality of other brake beams for actuating the levers which actuate the sets of brake shoes located between the wheels and each extending transversely between each two pairs of wheels and operatively connecting the upper ends of the levers which are located oppositely to each other transversely of the vehicle, and a mechanism for individually actuating the last mentioned brake beams.

26. In a brake mechanism for a vehicle having a series of pairs of wheels, a set of two brake shoes located between each two adjacent wheels at each side of the vehicle and one of said brake shoes of the set being movable into braking engagement with one wheel and the other being movable into braking engagement with the adjacent wheel, a plurality of brake levers each arranged for actuating one set of brake shoes, a plurality of brake beams for actuating said levers and each extending transversely between each two pairs of wheels and operatively connecting the lower ends of the levers located oppositely to each other transversely of the vehicle, a system of operatively connected levers and rods for actuating said brake beams, a plurality of other brake beams for actuating said levers and each extending transversely between each two pairs of wheels and operatively connecting the upper ends of levers located opositely to each other transversely of the vehicle, two brake shoes one associated with each wheel of the one end pair of wheels, a pair of levers one for actuating each of said last mentioned brake shoes, a brake beam for actuating said two last mentioned levers connecting their upper ends, and a mechanism for individually actuating said other brake beams and said last mentioned brake beam.

27. In a brake mechanism for a vehicle having a series of pairs of wheels, a set of two brake shoes located between each two adjacent wheels at each side of the vehicle and one of said brake shoes of the set being movable into braking engagement with one wheel and the other being movable into braking engagement with the adjacent wheel, a plurality of brake levers each arranged for actuating one set of brake shoes, a plurality of brake beams for actuating said levers and each extending transversely between each two pairs of wheels and operatively connecting the lower ends of the levers located oppositely to each other transversely of the vehicle, two brake shoes one associated with each wheel of the one end pair of wheels, a pair of levers one for actuating each of said last mentioned brake shoes, a brake beam for actuating said two last mentioned levers connecting their lower ends, a system of operatively connected levers and rods for actuating all of said previously mentioned brake levers, a plurality of other brake beams for actuating the levers which actuate the sets of brake shoes located between the wheels and each extending transversely between each two pairs of wheels and operatively connecting the upper ends of the levers which are located opositely to each other transversely of the vehicle, two brake shoes one associated with each wheel of the other end pair of wheels, a pair of levers one for actuating each of said last mentioned brake shoes, a brake beam for actuating said two last mentioned levers connecting their upper ends, and a mechanism for individually actuating said other brake beams and said last mentioned brake beam.

28. In a brake mechanism for a vehicle having four pairs of wheels, a brake beam associated with each pair of wheels, a brake shoe for each wheel operatively connected with the associated brake beam, two brake cylinders, linkage for operatively connecting one of said cylinders with one of said brake beams at its center and with each of two other brake beams adjacent their one end, and other linkage for operatively connecting the other cylinder with the remaining brake beam at its center and with said two other brake beams adjacent their other end.

29. In a brake mechanism for locomotives having four pairs of wheels, the combination with brake shoes applied to each pair of wheels, of two brake cylinders one located on each side of the locomotive adjacent one end of the locomotive, linkage connecting one of said cylinders with the brake shoe for each wheel of one pair of wheels and with the brake shoe for one wheel of each of two other pair of wheels on the same side of the locomotive as said one cylinder, and other linkage connecting the other brake cylinder with the brake shoe for each wheel of the remaining pair of wheels and with the brake shoe for the other wheel of each of said two pairs of wheels.

30. In a brake mechanism for a vehicle having a first, a second, a third and a fourth pair of wheels; a first, a second, a third and a fourth brake beam associated respectively with said first, second, third and fourth pairs of wheels; two brake cylinders mounted on the vehicle at the end nearest said first pair of wheels, linkage including equalizing levers for connecting one of said cylinders with the center of said first brake beam and with one end of each of said third and fourth brake beams, and other linkage including equalizing levers for connecting the other cylinder with the center of said second brake beam and with the other end of each of said third and fourth brake beams.

31. In a brake mechanism for a vehicle having four pairs of wheels, a brake shoe associated with each wheel, a brake beam extending transversely of the vehicle adjacent each pair of wheels and operatively connected at its ends with the two brake shoes for the associated pair of wheels, two brake cylinders one located on each side of the locomotive, two brake cylinder levers pivotally supported intermediate their ends and operatively connected at their upper ends with said two brake cylinder levers respectively, linkage operatively connecting the lower end of one lever with one of said brake beams at its center and with two other of said brake beams adjacent the ends which are located on the same side of the vehicle as the brake cylinder which operates said one lever, and other linkage operatively connecting the lower end of the other lever with the remaining brake beam at its center and with said two other brake beams adjacent the ends which are located on the same side of the vehicle as the brake cylinder which operates said other lever.

32. In a brake mechanism for a vehicle having a first, a second, a third and a fourth pair of wheels; a first, a second, a third and a fourth brake beam associated respectively with said first, second, third and fourth pairs of wheels respectively, a first and a second equalizing lever operatively connected at one end with said first brake beam at points equally spaced from its ends and at the other end with said second brake beam at points equally spaced from its ends, a third equalizing lever operatively connected at one end with said first equalizing lever at its center and operatively connected at the other end with said third brake beam at its center, a fourth equalizing lever operatively connected at one end with said second equalizing lever at its center and operatively connected at the other end with said first brake beam at its center, and power means operatively connected with said third and fourth equalizing levers at their centers.

33. In a brake mechanism for a vehicle having a first, a second, a third and a fourth pair of wheels; a first, a second, a third and a fourth brake beam associated respectively with said first, second, third and fourth pairs of wheels respectively, a first and a second equalizing lever operatively connected at one end with said first brake beam at points equally spaced from its ends and at the other end with said second brake beam at points equally spaced from its ends, a third equalizing lever operatively connected at one end with said first equalizing lever at its center and operatively connected at the other end with said third brake beam at its center, a fourth equalizing lever operatively connected at one end with said second equalizing lever at its center and operatively connected at the other end with said first brake beam at its center, a first brake cylinder operatively connected with said third equalizing lever at its center, and a second brake cylinder operatively connected with said fourth equalizing lever at its center.

34. In a brake mechanism for a vehicle having a first, a second, a third and a fourth pair of wheels; a first, a second, a third and a fourth brake beam associated respectively with said first, second, third and fourth pairs of wheels respectively, a first and a second equalizing lever operatively connected at one end with said first brake beam at points equally spaced from its ends and at the other end with said second brake beam at points equally spaced from its ends, a third equalizing lever operatively connected at one end with said first equalizing lever at its center and operatively connected at the other end with said third brake beam at its center, a fourth equalizing lever operatively connected at one end with said second equalizing lever at its center and operatively connected at the other end with said first brake beam at its center, two brake cylinders, means including a first brake cylinder lever for operatively connecting one of said brake cylinders with said third equalizing lever at its center, and means including a second brake cylinder lever for operatively connecting the other of said brake cylinders with said fourth equalizing lever at its center.

35. In a brake rigging for a vehicle having a first, second, third and fourth pair of wheels, first, second, third and fourth brake beams associated with said first, second, third and fourth pairs of wheels respectively, brake shoes associated with each pair of wheels and operatively connected with the associated brake beam, first and second pull rods pivotally connected at one end with said first brake beam at points equally spaced from its ends, first and second equalizing levers pivotally connected at one end with the free ends of said first and second pull rods respectively and operatively connected at the other end with said second brake beam at points equally spaced from its ends, a third pull rod pivotally connected at one end with said first equalizing lever at or near its center, a third equalizing lever pivotally connected at one end with said third pull rod and operatively connected at its other end with said third brake beam at or near its center, a fourth pull rod pivotally connected at one end with said second equalizing lever at or near its center, a fifth pull rod pivotally connected at one end with the free end of said fourth pull rod, a fourth equalizing lever pivotally connected at one end with said fifth pull rod at its free end and operatively connected at its other end with said fourth brake beam at or near its center, a sixth pull rod pivotally connected at one end with said third equalizing lever at or near its center, a seventh pull rod pivotally connected at one end with said fourth equalizing lever at or near its center, and power means connected with the free ends of said sixth and seventh pull rods for actuating said brake beams.

36. In a system of clasp brakes, a vehicle frame supported by wheel and axle assemblies, upper and lower brake rigging associated with said wheels for braking cooperation therewith, floating hangers pivotally connected to said upper and lower brake rigging, each of said hangers having mounted thereon a pair of oppositely disposed brake clogs.

37. The invention of claim 36 characterized further by the fact that said brake rigging has equalizer beams and said floating hangers are pivotally attached to the equalizer beams of said brake rigging.

38. The invention of claim 36 characterized further by the fact that said brake clogs are arranged in pairs to clasp each of said wheels between diametrically opposite clogs.

39. In a system of brakes, a vehicle frame supported by wheels, and upper and lower brake rigging associated with said wheels for braking cooperation therewith, including a floating hanger having a pair of oppositely disposed brake clogs pivotally attached thereto, each clog being in braking cooperation with a different wheel.

40. In a system of brakes, a vehicle frame supported by wheels, a floating hanger including an operating mechanism attached to its upper and lower ends and attached to said frame, and oppositely disposed brake clogs attached at each end of said floating hanger, each of said clogs being in braking cooperation with different but adjacent wheels.

41. In a system of clasp brakes, a vehicle frame supported by closely spaced wheels, brake clogs in braking cooperation with said wheels, each wheel being clasped between a pair of oppositely disposed and diametrically positioned clogs, said clogs being positioned above or below the line of wheel centers, floating hangers pivotally attached to the oppositely disposed clogs of adjacent wheels, equalizer beams pivotally attached to the upper and lower portions of said floating hangers, operating links attached to said equalizer beams, and an operating means connected to said operating links.

42. The invention of claim 41 characterized further by the fact that there is a means for adjusting said operating links to provide for brake wear, and coordination of the system.

FREDERICK G. WILLIAMSON.